United States Patent
Levit-Gurevich et al.

(10) Patent No.: US 8,621,459 B2
(45) Date of Patent: Dec. 31, 2013

(54) METHOD AND APPARATUS FOR MULTITHREADED GUEST OPERATING SYSTEM EXECUTION THROUGH A MULTITHREADED HOST VIRTUAL MACHINE MONITOR

(75) Inventors: Konstantin Levit-Gurevich, Kiryat Byalik (IL); Boaz Ouriel, Zichron Yakov (IL)

(73) Assignee: Intel Corporation, Santa Clara, CA (US)

( * ) Notice: Subject to any disclaimer, the term of this patent is extended or adjusted under 35 U.S.C. 154(b) by 1786 days.

(21) Appl. No.: 11/615,821

(22) Filed: Dec. 22, 2006

(65) Prior Publication Data
US 2008/0155536 A1 Jun. 26, 2008

(51) Int. Cl.
*G06F 9/455* (2006.01)
(52) U.S. Cl.
USPC .......................................................... 718/1
(58) Field of Classification Search
USPC .......................................................... 718/1
See application file for complete search history.

(56) References Cited

U.S. PATENT DOCUMENTS

| | | | | |
|---|---|---|---|---|
| 6,496,847 | B1 * | 12/2002 | Bugnion et al. | 718/1 |
| 6,957,432 | B2 * | 10/2005 | Ballantyne | 718/100 |
| 2005/0076155 | A1 * | 4/2005 | Lowell | 710/1 |
| 2005/0132363 | A1 * | 6/2005 | Tewari et al. | 718/1 |
| 2005/0240700 | A1 * | 10/2005 | Bennett et al. | 710/260 |

* cited by examiner

*Primary Examiner* — Mengyao Zhe
(74) *Attorney, Agent, or Firm* — Trop, Pruner & Hu, P.C.

(57) ABSTRACT

Methods and apparatus for virtualization of guest operating systems (OSs) include allocating virtual machines (VMs). The VMs are assigned to each of the available hardware threads and resumed or launched for the first time. If scheduling of additional VMs is required upon exiting the VM context, another VM is selected and assigned to the hardware thread to be resumed or launched. A VM monitor is used to resume or launch a VM while the host operating system is prevented from controlling the hardware thread. A VM context structure is loaded. The thread is set to the state of the guest OS and the VM context is resumed or launched. The state of the guest OS is saved locally during a context switch to the context of the VM monitor. The VM context structure is then cleared and the host OS is allowed to control the hardware thread again.

9 Claims, 4 Drawing Sheets

METHOD AND APPARATUS FOR MULTITHREADED GUEST OPERATING SYSTEM EXECUTION THROUGH A MULTITHREADED HOST VIRTUAL MACHINE MONITOR

FIELD OF THE DISCLOSURE

This disclosure relates generally to the field of multi-threaded microprocessors. In particular, the disclosure relates to the use of a virtual machine monitor in a host operating system for scheduling execution of multiple operating systems on execution threads of a multithreaded processor.

BACKGROUND OF THE DISCLOSURE

One early technique for executing multiple operating systems on mainframes was known as a hypervisor. Hypervisors permitted multiple departmental computers to be consolidated into a single larger computer and to run multiple operating systems simultaneously through virtualization of the state of the supervisor (the term used at the time for an operating system kernel). Each of the multiple operating systems ran on a virtual machine (VM) and even if one operating system crashed, the others would continue working.

Today's high-end servers often support virtualization and some form of hypervisor technology but usually at server-class prices (up to multiple millions of dollars).

Microprocessor based platforms have supported some types of virtual machine environments in the past, but usually for supporting applications of a different operating system rather than supporting execution of multiple operating systems simultaneously. The full virtualization of personal computer through hypervisors has had significant costs in complexity and runtime performance Alternative approaches require modification of a guest operating system to make system calls (sometimes called hypercalls, diagnose code, or paravirtualization) to a hypervisor rather than executing machine I/O instructions. Such paravirtualization calls are then simulated by the hypervisor.

Some microprocessor vendors have also introduced hardware virtualization support. For example, Vanderpool Technology (VT) developed at Intel Corporation of Santa Clara, Calif., provides architectural and instruction level support for some virtualization assistance which are otherwise inefficient or require modification of guest operating systems. In addition, some microprocessors today provide support for multi-threading, simultaneous multithreading and/or multiple processor cores, which theoretically could provide for higher performance execution of multiple operating systems. To date, the advantages of these parallel hardware and virtualization features have not been fully utilized.

BRIEF DESCRIPTION OF THE DRAWINGS

The present invention is illustrated by way of example and not limitation in the figures of the accompanying drawings.

DETAILED DESCRIPTION

Figure 1:
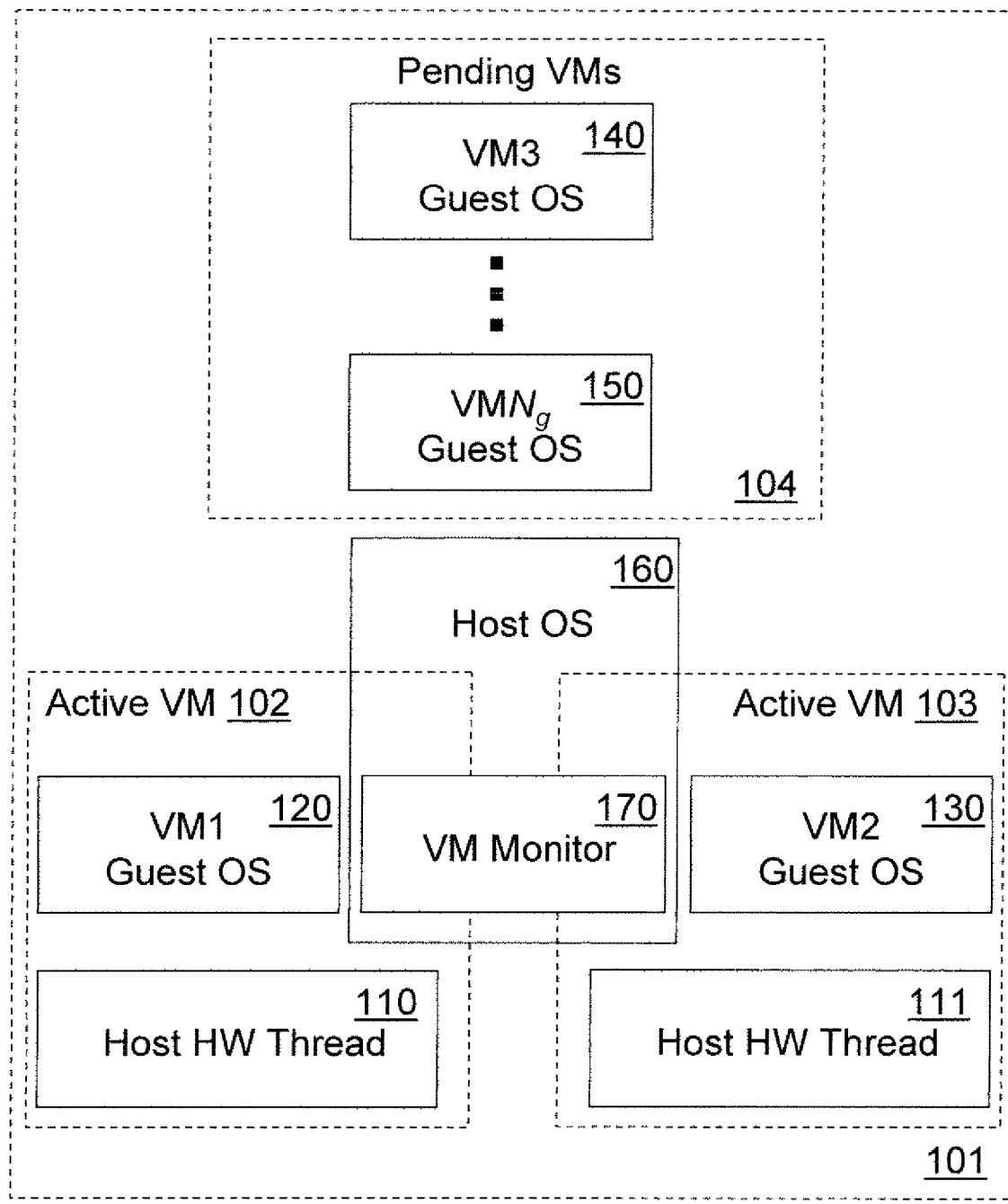
FIG. 1 illustrates one embodiment of a multiprocessing system for executing guest operating systems (OS) using a virtual machine (VM) monitor.

Disclosed herein are processes and apparatus for efficient virtualization of one or more multiprocessing guest operating system (OS) on a multiprocessing host platform. Virtual machines are allocated for each of the multiprocessing guest OS processors. Hardware execution threads are also allocated from the available hardware execution treads of the host multiprocessing system. One of the virtual machines is assigned to each of the hardware execution threads and these virtual machines are resumed (if previously launched) or otherwise launched for the first time. If scheduling of another virtual machine is required upon exiting the virtual machine context, another of the virtual machines is selected and assigned to the current hardware thread to be resumed or launched for the first time.

Also disclosed are processes and apparatus for supporting guest OS execution using a virtual machine monitor inside a special critical section to launch or to resume a virtual machine context. An interrupt flag is cleared to prevent a host operating system from controlling one of a plurality of hardware threads. A virtual machine context structure is then loaded and the hardware thread is set to the state of a guest operating system. The virtual machine context is either resumed or launched for the first time. Then the state of the guest operating system is saved locally and a context switch is made to the context of a virtual machine monitor. The virtual machine context structure is cleared from the hardware thread and the interrupt flag is then set to allow the host operating system to control the hardware thread again.

By employing embodiments of the disclosed processes and apparatus a virtual machine monitor may make use of all available host hardware to run multi-processor guest operating systems. Therefore, performance of virtualized guest software is improved as well as synchronization of guest execution threads. Some disclosed embodiments may be employed in platform simulators to improve performance of multi-threaded software applications.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Some embodiments may make use of Intel® Vanderpool Technology (Intel® Vanderpool Technology for IA-32 Processors (VT-x) Preliminary Specification, Order No. C97063-001; Intel® Vanderpool Technology for the Intel® Itanium Processor (VT-i), order No. 305942-002; available via FTP at download.intel.com/technology/computing/vptech/). Some known structures, circuits, architecture-specific features and the like have not been shown in detail to avoid unnecessarily obscuring the present invention.

FIG. 1 illustrates one embodiment of a multiprocessing system 101 for executing one or more guest multiprocessing operating system (OS) 120-150 using a virtual machine (VM) monitor 170 to virtualize guest OS 120-150 on the available hardware threads 110-111 of multiprocessing system 101. The one or more guest multiprocessing OS comprise $N_g$ virtual processors and so during initialization virtual machines are created: VM1 for guest OS thread 120, VM2 for guest OS thread 130, VM3 for guest OS thread 140, ..., and VMN$_g$ for guest OS thread 150. VM monitor 170 is created to run under lost OS 160 and to manage the virtual machines. One of the roles of VM monitor 170 is to concurrently launch a VM on each of the available hardware threads 110-111 of multiprocessing system 101.

It will be appreciated that the availability of multithreaded hardware and architectural support such as Vanderpool Technology makes possible the efficient virtualization of a multiprocessing guest OS, which may utilize all of the available hardware execution threads of the multiprocessing host platform.

Figure 2:
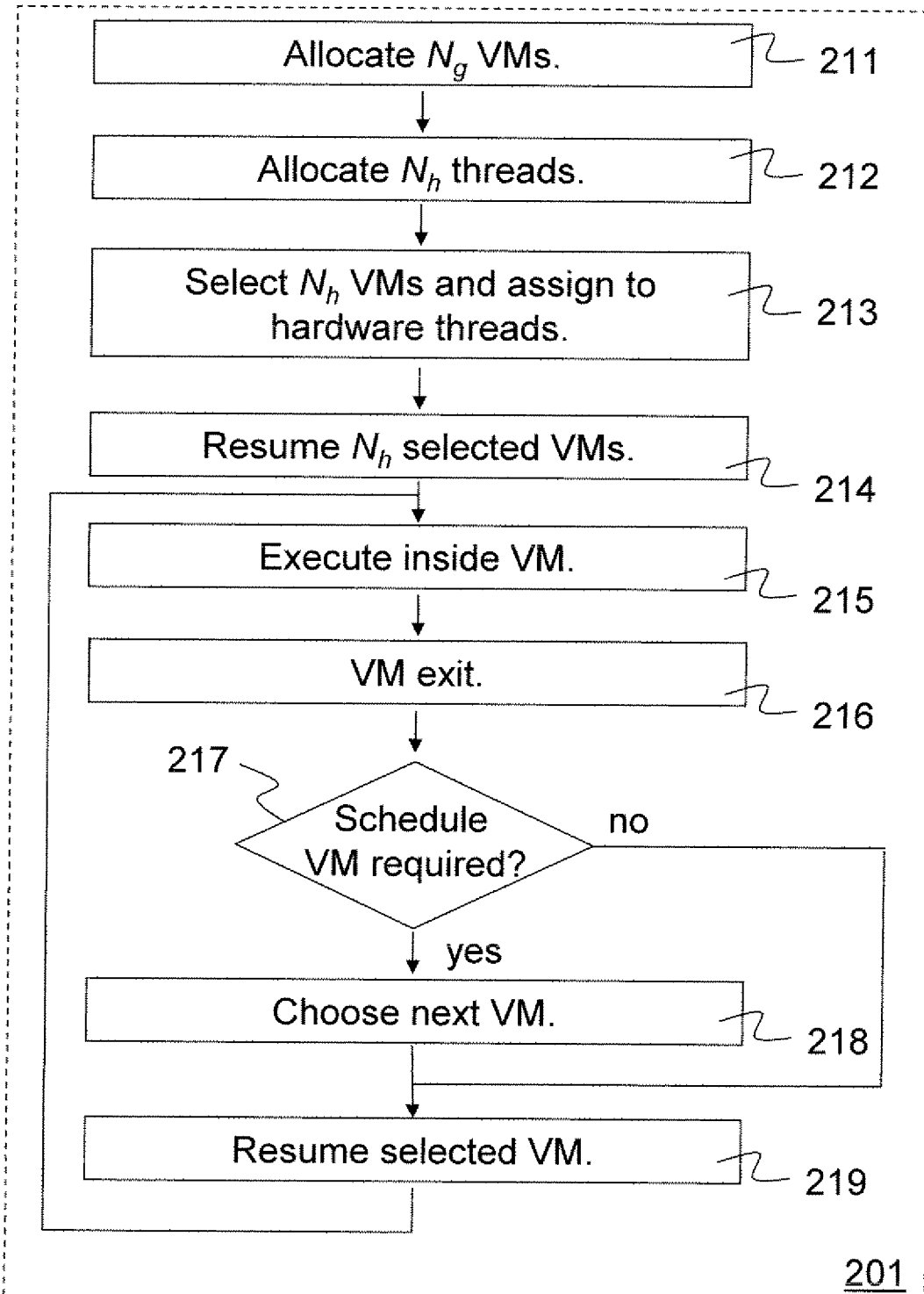
FIG. 2 illustrates a flow diagram for one embodiment of a process to virtualize one or more multiprocessing guest OS on the available hardware threads of a multiprocessing host platform.

FIG. 2 illustrates a flow diagram for one embodiment of a process 201 to virtualize one or more multiprocessing guest OS on the available hardware execution threads of a multiprocessing host platform. Process 201 and other processes herein disclosed are performed by processing blocks that may comprise dedicated hardware or software or firmware operation codes executable by general purpose machines or by special purpose machines or by a combination of both.

In processing block 211, N$_g$ virtual machines are allocated for processors of one or more guest multiprocessing OS. In processing block 212, N$_h$ hardware execution threads are allocated from the available hardware threads of a multiprocessing host platform. Then in processing block 213, a VM of the N$_g$ virtual machines is selected for assignment to each of the available N$_h$ hardware execution threads. In processing block 214 the N$_h$ virtual machines assigned to the hardware threads are resumed (if previously launched) or otherwise launched for the first time. In processing block 215, execution inside the particular VM occurs. Upon exiting the VM context of each of the hardware execution threads in processing block 216, a determination is made in processing block 217 if scheduling of another VM is required. If it is determined that scheduling of another VM is required then execution continues in processing block 218 where another of the virtual machines is chosen for assignment to that particular hardware execution thread. Otherwise execution proceeds directly to processing block 219 where the virtual machine assigned to the current hardware execution thread is resumed (if previously launched) or launched for the first time. Execution then resumes inside that particular VM in processing block 215 followed by another iteration of processing blocks 216-219.

It will be appreciated that the launch sequence of a VM may need to be protected from interruption, in order to prevent the host OS from performing a thread rescheduling, for example, while the VM monitor is in the process of attaching a VM control structure to the hardware execution thread. Such interruptions could have potentially devastating effects on the VM monitor, the hardware execution thread and/or the host OS. Therefore, in some embodiments the launch sequence of a VM using a VM monitor is executed inside a protected critical section with interrupts disabled.

Figure 3:
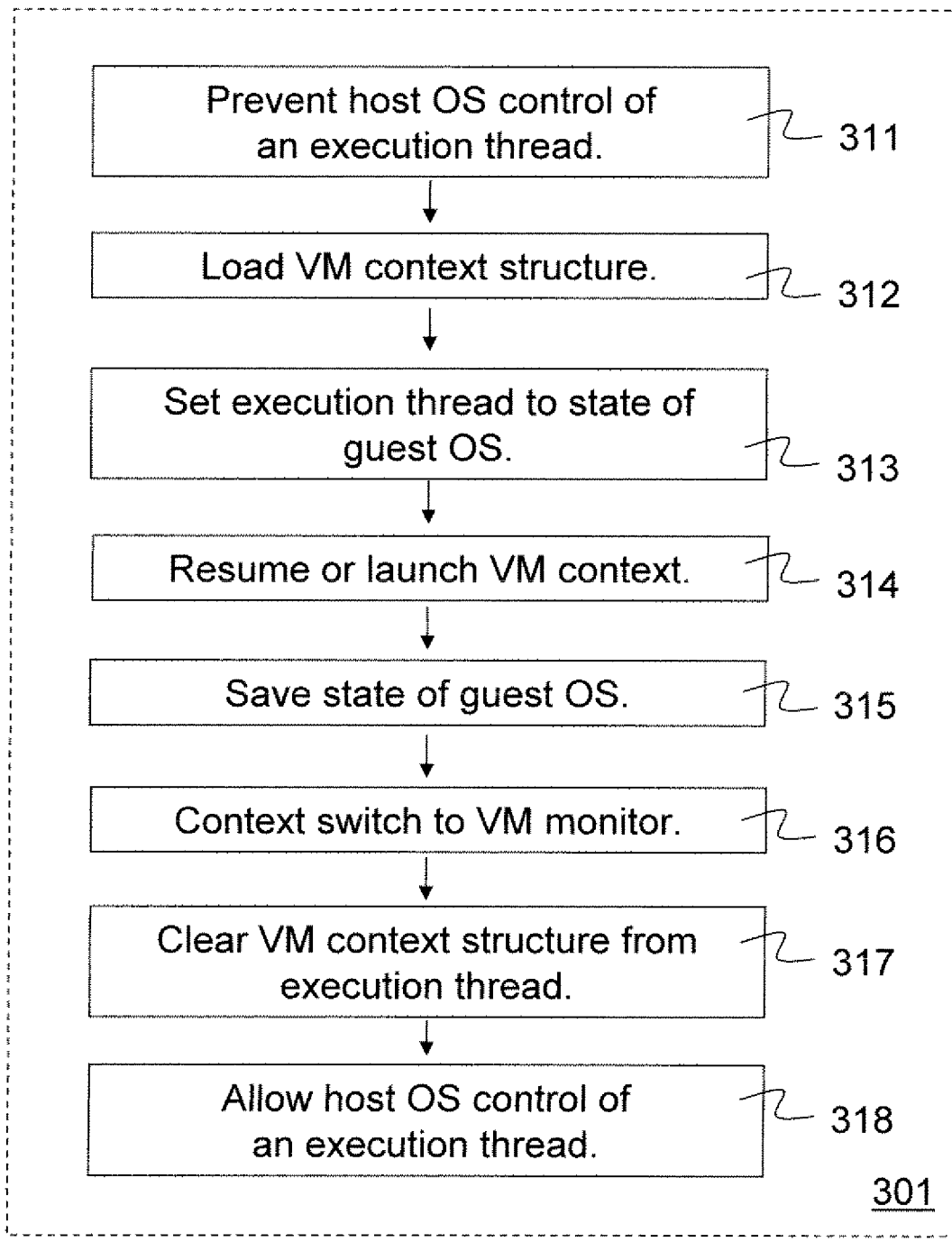
FIG. 3 illustrates a flow diagram for one embodiment of a process for protecting a launch sequence of a VM using a VM monitor inside a critical section on a multithreaded host platform.

FIG. 3 illustrates a flow diagram for one embodiment of a process 301 for protecting the launch sequence of a VM using a VM monitor inside a critical section on a multithreaded host platform. In processing block 311 the host operating system is prevented from controlling one of the hardware execution threads. For one embodiment this may be accomplished through clearing an interrupt flag (IF) to disable interrupts. An instruction, CLI, may be provided, for example, specifically to clear the interrupt flag. In some embodiments the current privilege level may be checked before clearing of the interrupt flag may be allowed.

Next, in processing block 312 a virtual machine context structure (VMCS) is loaded or activated. This may be accomplished in some embodiments by executing an instruction (VMPTRLD) specifically for marking a VMCS valid and loading from a pointer address to the VMCS. Some embodiments may require a specified privilege level (level zero, for example, while in protected mode or in 64-bit mode) in order to complete such an instruction. In processing block 313 processor state of the hardware execution thread is set to the state of a guest operating system. For some embodiments a guest-state area in the VMCS may be loaded to the processor state upon VM entries and the processor state may be saved to this guest-state area upon VM exits. Some additional state of the guest OS may be determined by specific controls for VM entries, which are set in the VMCS Other state such as page-directory pointers may be loaded based on the values of certain control registers. In processing block 314 the VM context is resumed (if previously launched) or otherwise launched for the first time. Some embodiments may provide for a VM entry instruction (VMRESUME) specifically to resume the VM context, and a VM entry instruction (VMLAUNCH) specifically to launch the VM context. Again, some embodiments may require a specified privilege level (level zero, for example) in order to complete such instructions.

In processing block 315 the state of the guest operating system is saved locally. For some embodiments this operation is caused by a VM exit. In processing block 316 a context switch is made to the context of the VM monitor. In some embodiments a VM exit instruction (VMCALL) may be provided specifically to perform such a context switch to the VM monitor. In alternative embodiments a task switch may be invoked externally by setting a task gate or by entering a debug mode such a single-stepping. In other alternative embodiments an event, for example accessing a control register or executing an I/O instruction, may be set to trigger the task switch. In processing block 317 the VMCS from this hardware execution thread is cleared. In some embodiments an instruction (VMCLEAR) may be provided specifically to clear the current VMCS from a hardware execution thread. Finally, in processing block 318 the interrupt flag (IF) is reset to allow the host operating system to regain control the hardware execution thread. Thus the launch sequence of a VM may be protected by such a critical section to prevent the host OS from performing a thread rescheduling.

Figure 4:
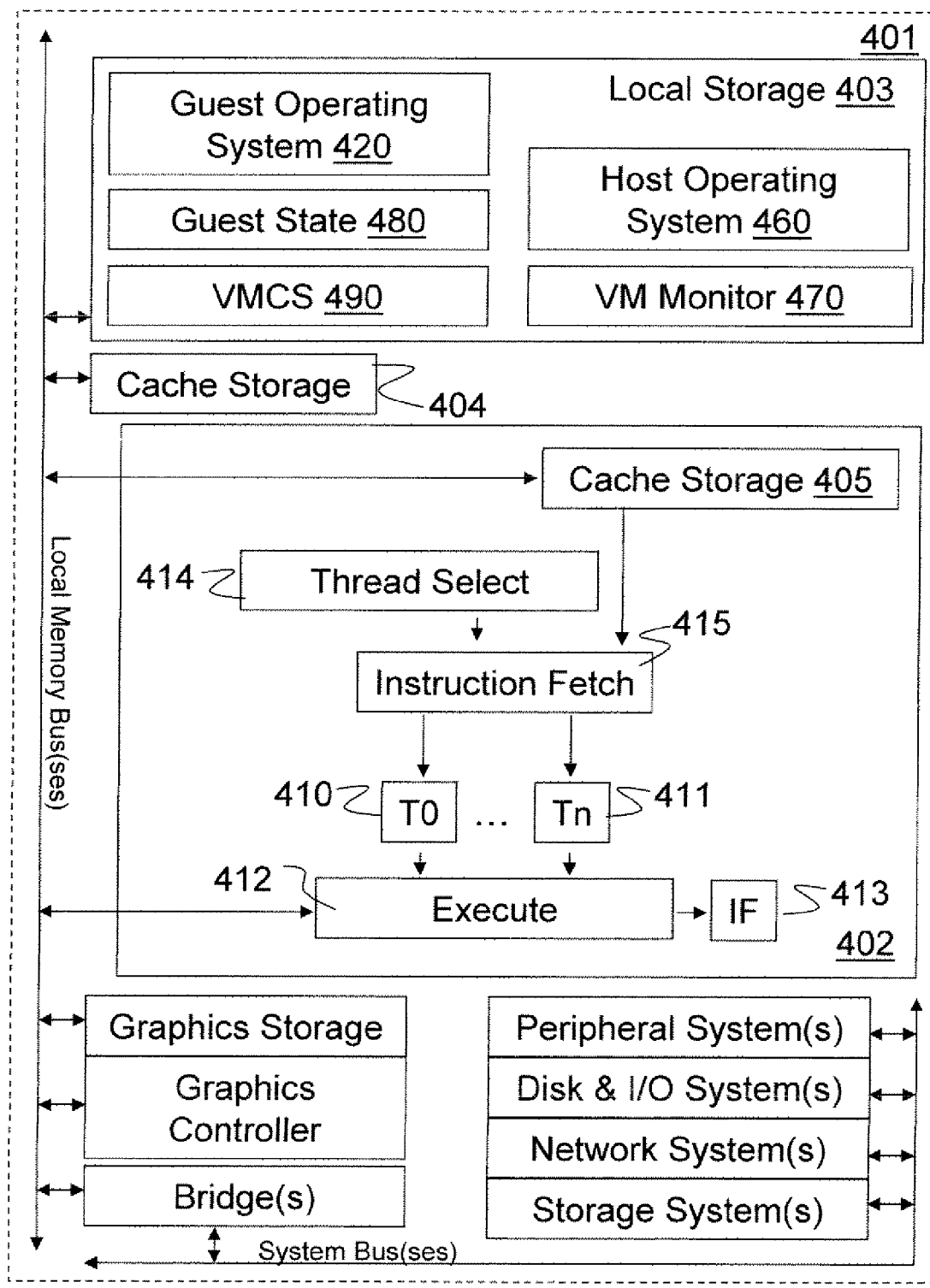
FIG. 4 illustrates another embodiment of a multiprocessing system for virtualizing one or more multiprocessing guest OS and for protecting the launch sequences of virtual machines (VMs) using a VM monitor inside a critical section.

FIG. 4 illustrates another embodiment of a multiprocessing system 401 for virtualizing one or more multiprocessing guest OS 420. Multiprocessing system 401 may include an addressable memory, local storage 403, and cache storage 404 to store data and executable programs, graphics storage and a graphics controller, and various systems optionally including peripheral systems, disk and I/O systems, network systems including network interfaces to stream data for storage in addressable memory, and external storage systems including magnetic storage devices to store instructions of multiple software execution threads, wherein the instructions being accessed by the processor 402, cause the processor to process the instructions of the multiple software execution threads. Local storage 403, for example, may store one or more guest multiprocessing OS 420 having multiple software execution threads to be executed on virtual processors. Local storage 403 may also store the virtual processor's associated guest state 480 along with a multithreaded host OS 460, a multithreaded VM monitor 470 and VM control structures 490.

Multiprocessing system 401 executes one or more guest multiprocessing OS 420 using the VM monitor 470 inside a protected critical section as described with regard to processes 201 and 301 to virtualize guest OS 420 on the available hardware threads 410-411. VMs are created for the virtual processors of the one or more guest multiprocessing OS 420. VM monitor 470 runs under Host OS 460 to manage the VMs used to virtualize guest OS 420. One of the roles of VM monitor 470 is to concurrently launch a VM on each of the available hardware threads 410-411 of multiprocessing system 401.

Execution inside the particular VM occurs concurrently in processor 402 wherein copies of executable instructions of multithreaded host OS 460, multithreaded VM monitor 470 and multithreaded guest OS 420 stored in cache storage 404 and/or cache storage 405 may be fetched by instruction fetch logic 415 under the direction of thread select logic 414 and allocated to the appropriate hardware thread 410-411 for execution by execution logic 412. Upon exiting a VM context of each of the hardware execution thread 410-411 associated with, multithreaded guest OS 420, a determination may be made within the context of multithreaded VM monitor 470 if scheduling of another VM associated with multithreaded guest OS 420 is required and if so, another of the virtual machines may be chosen for assignment to that particular hardware execution thread. Otherwise the VM already assigned to that hardware execution thread may be resumed.

Thus efficient virtualization of a multithreaded guest OS may be realized, which can utilize all of the available hardware execution threads of the multiprocessing host platform.

The above description is intended to illustrate preferred embodiments of the present invention. From the discussion above it should also be apparent that especially in such an area of technology, where growth is fast and further advancements are not easily foreseen, the invention can be modified in arrangement and detail by those skilled in the art without departing from the principles of the present invention within the scope of the accompanying claims and their equivalents.

What is claimed is:

1. A computerized method for resuming or launching a virtual machine, the method comprising:
 disabling interrupts by clearing an interrupt flag to prevent a host operating system from controlling a first hardware thread of a plurality of hardware threads;
 loading a first virtual machine context;
 setting the first hardware thread to the state of a first guest operating system, wherein the first guest operating system executes within the first virtual machine context;
 resuming or launching the first virtual machine context;
 saving the state of the first guest operating system locally;
 performing a context switch to the context of a virtual machine monitor, wherein the virtual machine monitor executes under the host operating system and the virtual machine monitor schedules the first virtual machine context;
 clearing the first virtual machine context from the first hardware thread; and
 setting the interrupt flag to allow the host operating system to control the first hardware thread.

2. The method of claim 1 wherein loading a first virtual machine context structure comprises executing a VMPTRLD instruction to mark the first virtual machine context structure valid and load it from a specified address in memory.

3. The method of claim 2 wherein setting the first hardware thread to the state of the first guest operating system comprises loading a guest-state area of the first virtual machine context.

4. An article of manufacture comprising:
 a non-transitory computer-readable storage medium including executable instructions that, when accessed by a machine, cause the machine to:
 disable interrupts by clearing an interrupt flag to prevent a host operating system from controlling a first hardware thread of a plurality of hardware threads;
 load a first virtual machine context;
 set the first hardware thread to the state of a first guest operating system, wherein the first guest operating system executes within the first virtual machine context;
 resume or launch the first virtual machine context;
 save the state of the first guest operating system locally;
 perform a context switch to the context of a virtual machine monitor, wherein the virtual machine monitor executes under the host operating system and the virtual machine monitor schedules the first virtual machine context;
 clear the first virtual machine context from the first hardware thread; and
 set the interrupt flag to allow the host operating system to control the first hardware thread.

5. The article of manufacture of claim 4 wherein said storage medium includes an executable to mark the first virtual machine context structure valid and load it from a specified address in memory.

6. The article of manufacture of claim 4 wherein the first hardware thread is set to the state of the first guest operating system by loading a guest-state area of the virtual machine context structure.

7. A computing system comprising:
 a processor having a plurality of hardware threads;
 a host operating system executable on the processor;
 a multithreaded guest operating system executable on a plurality of virtual machines of the processor;
 a multithreaded virtual machine monitor executable on the processor under the host operating system to schedule virtual machines on the plurality of hardware threads;
 the multithreaded virtual machine monitor to:
 disable interrupts by clearing an interrupt flag to prevent the host operating system from controlling a first hardware thread of the plurality of hardware threads;
 load a first virtual machine context;
 set the first hardware thread to the state of a first guest operating system, wherein the first guest operating system executes within the first virtual machine context;
 resume or launch the first virtual machine context;
 save the state of the first guest operating system locally;
 clear the first virtual machine context from the first hardware thread after a context switch to the context of the multithreaded virtual machine monitor; and
 set the interrupt flag to allow the host operating system to control the first hardware thread.

8. The computing system of claim 7 wherein said multithreaded virtual machine monitor includes an executable instruction to mark the first virtual machine context structure valid and load it from a specified address in memory.

9. The computing system of claim 8 wherein the first hardware thread is set to the state of the first guest operating system by loading a guest-state area of the virtual machine context structure.

\* \* \* \* \*